United States Patent [19]

Reichel et al.

[11] Patent Number: 4,637,893
[45] Date of Patent: Jan. 20, 1987

[54] DELAYED CO-INITIATION PROCESS FOR PREPARING POLYOL BLENDS

[75] Inventors: Curtis J. Reichel; William W. Levis, Jr., both of Wyandotte; Robert J. Hartman, Southgate, all of Mich.

[73] Assignee: BASF Corporation, Wyandotte, Mich.

[21] Appl. No.: 734,850

[22] Filed: May 16, 1985

Related U.S. Application Data

[63] Continuation-in-part of Ser. No. 458,287, Jan. 17, 1983, abandoned.

[51] Int. Cl.$^4$ ................................................ C09K 3/00
[52] U.S. Cl. ..................................... 252/182; 521/174
[58] Field of Search ........................ 252/182; 568/609; 521/174, 175

[56] References Cited

U.S. PATENT DOCUMENTS 4,029,593  6/1977  Schapel et al. ...................... 252/182
4,415,469  11/1983  Tsai ..................................... 252/182

*Primary Examiner*—Josephine L. Barr
*Attorney, Agent, or Firm*—Norbert M. Lisicki

[57] ABSTRACT

A delayed co-initiation process for preparing polyol blends comprising
(a) oxyalkylating a first initiator compound to obtain a polyol with a predetermined equivalent weight; and
(b) adding a second initiator which may be the same as or different from the first and oxyalkylating to obtain a polyol with a predetermined equivalent weight based upon the second initiator.

The resultant polyols are used in the preparation of polyurethane foams.

7 Claims, No Drawings

DELAYED CO-INITIATION PROCESS FOR PREPARING POLYOL BLENDS

This application is a continuation-in-part of copending application Ser. No. 458,287, filed on Jan. 17, 1983, now abandoned.

BACKGROUND OF THE INVENTION

1. Field of the Invention

This invention relates to a process for preparing polyol blends. It involves delayed co-initiation whereby a second initiator is added to the reaction vessel after a first initiator has reached the specified equivalent weight.

2. Description of the Prior Art

It is well known to prepare polyurethane products by the reaction of an organic polyisocyanate and a polyol such as a polyoxyalkylene polyether polyol. Such polyols are prepared by reacting an initiator containing two or more active hydrogen atoms as determined by the Zerewittinoff method with an epoxide, preferably an alkylene oxide. Generally the reaction between the organic polyisocyanate and polyol is carried out in the presence of a blowing agent, catalyst, and other well known ingredients.

It is also known that polyol blends can be used to vary the properties of the polyol (such as viscosity) and/or the polyurethane products. The problem with using blends, however, is that they are expensive to make because of the time and energy involved in mechanically blending the individual polyols to form the blend.

It is also known to prepare polyol blends by simultaneously reacting two or more initiators (co-initiation process) with an epoxide to form a polyol blend. This eliminates the need for mechanical blending and thereby reduces the cost of manufacturing the polyol.

SUMMARY OF THE INVENTION

The subject invention relates to a process for preparing polyol blends by delayed co-initiation which comprises
(a) oxyalkylating an initiator having at least two active hydrogen atoms as determined by the Zerewittinoff method until a predetermined equivalent weight is obtained; and
(b) thereafter adding a second initiator which may be the same or different and oxyalkylating until a predetermined equivalent weight is obtained.

The polyol blends produced by this process are similar to conventional blends except no manual mixing is required. The polyol blends can be used for making polyurethane products. They are particularly useful for making polyurethane flexible foams.

DESCRIPTION OF THE PREFERRED EMBODIMENTS

In order to prepare the polyol blends of the subject invention, the first initiator is charged to a reaction vessel along with an oxyalkylation catalyst. The reaction vessel is then heated to increased temperatures such as 110° C. to 160° C., and the epoxide or mixture thereof is added to the reactor in one step or multiple steps and allowed to react hours until the specified equivalent weight is reached.

After the polyol formed from the first initiator has reached the desired equivalent weight, then a second initiator is added to the reaction vessel. The second initiator may be added alone or with more epoxide, or more epoxide can be added after the addition of the second initator.

Initiators which can be used in the subject process are compounds which contain at least two activehydrogen atoms as determined by the well-known Zerewittinoff method. Typical compounds which can be used include the following: water, propylene glycol, dipropylene glycol, diethylene glycol, ethylene glycol, 1,3-propanediol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,10-decanediol, 1,1,1-trimethylolethane, hexane-1,2,6-triol, α-methyl glucoside, pentaerythritol, hexamethylene glycol, glycerine, trimethylol propane, 1,3,6-hexanetriol, 1,2,6-hexanetriol, 1,4,8-octanetriol, and 1,5,10-dodecanetriol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl and ether of hydroxyquinone.

Epoxides which can be reacted with the initiators include 1,3-propane oxide, butylene oxide, styrene oxide, and preferably alkylene oxides such as ethylene oxide and propylene oxide. The epoxides may be used individually, alternatingly, in sequence, or as mixtures. Most preferred, however, are ethylene oxide, propylene oxide, and mixtures thereof.

If desired, an oxyalkylation catalyst can be used. Any oxyalkylation catalyst known in the art can be employed for this purpose. Examples of such catalysts are alkali metals such as sodium, potassium and lithium and alkali metal hydroxides such as sodium hydroxide, potassium hydroxide, lithium hydroxide, and the like.

The amount of oxyalkylation catalyst employed in the above process is generally within the range of about 0.0001 to about 1 part by weight of catalyst per 100 parts by weight of amine.

In a preferred embodiment of this invention, an oxyalkylated triol is first prepared having an average equivalent weight of from 100 to 10,000. Thereafter, a diol initiator is added either alone or along with an epoxide to form a blend of polyols having an average equivalent weight of from 100 to 10,000.

The subject polyols are preferably used to prepare polyurethane foams, preferably flexible polyurethane foams. In order to prepare flexible polyurethane foams, the resulting polyol blends are reacted with an organic polyisocyanate in the presence of a blowing agent. Other ingredients such as catalysts, chain extenders, cross-linkers, surfactants, fillers, plasticizers, and flame retardants may also be used.

Organic polyisocyanates which may be used in the preparation of foams are well known to those skilled in the art and may be represented by the following formula:

wherein R" is a polyvalent organic radical which is either aliphatic, aralkyl, alkaryl, aromatic or mixtures thereof, and z is an integer which corresponds to the valence of R" and is at least two. Representative of the organic polyisocyanates contemplated herein includes, for example, aromatic diisocyanates such as 2,4-toluene diisocyanate, 2,6-toluene diisocyanate, mixtures of 2,4- and 2,6-toluene diisocyanate, crude toluene diisocyanate, diphenylmethane diisocyanate, crude diphenylmethane diisocyanate and the like; aromatic triisocyanates such as 4,4',4''-triphenylmethane triisocyanate, 2,4,6-toluene triisocyanates; aromatic tetraisocyanates such as 4,4'-dimethyldiphenylmethane-2,2',5,5'-tetraisocyanate, and the like; arylalkyl polyisocyanates such as xylene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine. Included within the usable isocyanates are modifications of the above isocyanates which contain carbodiimide, allophanate, urea or isocyanurate structures. Prepolymers and quasi-prepolymers may also be employed as the organic polyisocyanate. The useful prepolymers are isocyanate-terminated reaction products of an organic polyisocyanate and an active hydrogen compound such as a polyol. The quasi-prepolymers are solutions of prepolymers in an excess of organic polyisocyanate and are prepared by reacting an excess of organic polyisocyanate or mixture thereof with a minor amount of an active hydrogen compound, preferably a polyol. Generally, the quasi-prepolymer will have a free isocyanate content of about 20 percent to 40 percent by weight. Active hyrogen compounds are those compounds which have in their structure reactive hyrogens as determined by the Zerewittinoff test, as described by Kohler in the *Journal of the American Chemical Society*, Vol. 49, page 3181 (1972). These compounds and their method of preparation are well known in the art.

The preferred blowing agent which is used in accordance with the process of this invention is water which reacts with isocyanate groups to form carbon dioxide. The amount of water which may be used advantageously is 0.1 part to 8 parts by weight, preferably 1.5 parts to 5 parts by weight relative to 100 parts by weight of polyol.

Physically acting blowing agents may also be used as mixtures with water. Suited for this purpose are liquids which are inert with respect to the organic polyisocyanates and which have boiling points below 100° C., preferably below 50° C. and particularly between —50° C. and 30° C. under atmospheric pressure so that they evaporate under the influence of the exothermal polyaddition reaction. Representative examples include hydrocarbons such as pentane, n- and isobutane and propane, ethers such as dimethylether and diethylether, ketones such as acetone and methylethylketone, and ethylacetate, and preferably halogenated hydrocarbons such as methylene chloride, trichlorofluoromethane, dichlorofluoromethane, dichloromonofluoromethane, dichlorotetrafluoroethane and 1,1,2-trichloro-1,2,2-trifluoroethane. Mixtures of these low boiling liquids with each other and/or other substituted or non-substituted hydrocarbons may also be used.

The amount of physically acting blowing agents used in addition to water depends upon the foam density desired and is approximately 0 to 50 parts by weight, preferably 0 to 20 parts by weight per 100 parts of polyol. Under certain conditions, it may be advantageous to mix the organic polyisocyanate with the physically acting blowing agent thereby reducing the viscosity.

Preferably, the reaction takes place in the presence of catalysts. Any of the catalysts employed in the preparation of polyurethane foam can be employed in the subject invention. Representative of these catalysts include the tertiary amine catalysts such as diethylenetriamine, ketimine, tetramethylenediamine, triethylenediamine, tetramethylenediamine, tetramethylguanidine, trimethylpiperazine and the metalo-organic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous octoate, lead cyclopentanecarboxylate, cadmium, cyclohexanecarboxylate, lead naphthanate, lead octoate, cobalt naphthenate, zinc naphthenate, bis(phenylmercury)-dodecyl succinate, phenylmercuric benzoate, cadmium naphthenate, dibutyltin dilaurate and dibutyltin-di-2-ethylhexoate. Generally these catalysts will be employed in amounts ranging from about 0.01 part to 7.5 parts by weight based on the weight of the polyol.

Under certain circumstances, it may be advantageous to use chain extenders or cross-linking agents for the preparation of polyurethane foams. Representative examples of such materials include polyfunctional, particularly di and trifunctional compounds having molecular weights of 17 to 300. The following are specific examples of such compounds: di- and trialkanolamines such as diethanolamine and triethanolamine, aliphatic and aromatic diamines such as ethylenediamine, 1,4-butanediamine, 1,6-hexamethylenediamine, 4,4'-diaminodiphenylmethane, 3,3'-dialkyl-substituted 4,4'-diaminodiphenylmethane, 2,4- and 2,6-toluenediamine, and preferably the aliphatic diols and triols having 2 to 6 carbon atoms such as ethylene glycol, 1,4-butanediol, 1,6-hexamethylene glycol, glycerine, and trimethylol propane.

If chain extenders or cross-linking agents are used, they are used in quantities of 1 part to 60 parts, preferably 10 to 30 parts by weight per 100 part by weight of polyol.

Auxiliaries and additives may also be added to the reaction mixture. Examples include stabilizers, hydrolysis protection agents, pore regulators, fungistatically or bacteriostatically deterring substances, colors, pigments, fillers, surface-active materials, plasticizers and flame retardants.

Examples of surface-active substances include those which serve to support the homogenization of the raw materials and which may also be suited to regulate the cell structure of the foams. These include by way of example, polyoxyalkylene derivatives of siloxane or the alkylene oxide adducts of organic compounds containing reactive hyrogen atoms such as the ethylene oxide adducts of alcohols, glycols and phenols. Generally, the surfactants are employed in amounts ranging from about 0.01 part to 5 parts by weight per 100 parts of polyol.

It may also be advantageous to include a plasticizer in the reaction mixture in order to reduce brittleness of the foams. Commonly known plasticizers may be used. It is particularly advantageous to use those materials which contain phosphorus and/or halogen atoms and which, therefore, additionally increase the flame resistance of the polyurethane plastics. These materials include tricresyl phosphate, tris-2-chloroethyl phosphate, trischloropropyl phosphate, and tris-2,3-dibromopropyl phosphate.

In addition to the already mentioned halogen-substituted phosphates, inorganic flame retardants may also be used to render the polyurethane foams flame resistant. Examples of these include antimony trioxide, arsenic oxide, ammonium phoshate and calcium sulfate and melamine.

It generally has proven to be advantageous to use 5 to 50 parts by weight, preferably 5 to 25 parts by weight, of the referenced flame retardants per 100 parts by weight of polyol.

Conventional fillers for use herein include, for example, aluminum silicate, calcium silicate, magnesium silicate, calcium carbonate, barium sulfate, calcium sulfate, glass fibers, carbon black, and silica. The filler, if used, is normally present in an amount ranging from about 5 parts to 50 parts per weight per 100 parts of polyol.

A pigment which can be used herein can be any conventional pigment heretofor disclosed in the art such as titanium dioxide, zinc oxide, iron oxide, antimony oxide, chrome green, chrome yellow, iron blue siennas, molybdate oranges, and organic pigments such as para reds, benzidine yellow, toluidine red, toners, and phthalocyanines.

In order to prepare polyurethane foams according to the process of this invention, the ingredients are reacted at temperatures between 0° C. and 70° C., preferably 15° C. to 50° C., in such quantities that 0.5 to 2, preferably 0.8 to 1.3, and particularly approximately one reactive hydrogen atom in the reactants is present per isocyanate group.

The polyurethane foams may be produced according to the prepolymer or preferably according to the one-shot process. If the prepolymer process is used, it is advantageous to react small quantities of polyol and the organic polyisocyanate in a prior reaction stage to form a urea and possibly urethane group containing polyisocyanate. According to the one-shot process, the starting components, auxiliaries and additives are introduced individually via several feed nozzles when one mixing chamber is used and are intensively mixed in the mixing chamber. However, it has proven to be particularly advantageous to work according to the two-component process and to combine the polyols, catalysts, blowing agents and optionally the chain extenders or cross-linking agents, auxiliaries and additives in the so-called A component and to use the organic polyisocyanates, optionally as a mixture with physical blowing agents, auxiliaries and additives as the B component. This method is now predominantly used. An advantage of this process is the fact that the A and B components can be transported in a space-saving manner, can be stored for a limited amount of time, and only require intensive mixing prior to the manufacture of the polyurethane foams.

The examples which follow, along with this general description, are designed to enable those skilled in the art to practice the invention. They are not intended to limit the scope of the application of the invention. The parts referred to in the examples are by weight and the temperatures are in degrees centigrade unless otherwise stated.

The following abbreviations are used in the examples:

| | |
|---|---|
| DABCO 33LV | triethylenediamine. |
| EO | ethylene oxide. |
| PO | propylene oxide. |
| L-520 | a surfactant sold by Union Carbide |
| T-9 | dibutyltin dilaurate, a catalyst. |
| TDI | a mixture of 2,4- and 2,6-toluene diisocyanate wherein the 2,4-isomer is approximately 80 percent by weight of the mixture. |
| GP | a propylene oxide adduct of glycerin containing 2.9 percent by weight of KOH as catalyst. |
| DPG | dipropylene glycol. |

EXAMPLES

Examples 1–5 illustrate the preparation of polyol blends by the delayed co-initiation process.

EXAMPLE 1

In a clean, dried, and evacuated reactor was charged 542 parts of GP. The reactor was purged and pressure checked in the usual manner and heated to 105° C. After the reactor was evacuated to 60 mm Hg and sealed, mixed oxides comprised of 918 parts of EO and 3130 parts of PO were were added in 7 hours. The reactor was allowed to heat at 105° C. for 4 hours and then vented to 0 psig. Then 215 parts of DPG were added to the reactor and evacuation to 60 mm Hg was carried out. Thereafter, 1195 parts of PO were added at 105° C. The product was treated with adsorbent to remove the catalyst and stabilized with antioxidants.

The resulting product had a hydroxyl number of 56.8.

EXAMPLE 2

The procedure of Example 1 was followed except 528 parts of GP, 918 parts of EO, and 1104 parts of PO were added in the first addition. In the second addition, 215 parts of DPG and 3235 parts of PO were added. The DPG was added before the PO. The polyol had a 50 percent by weight PO cap and a hydroxyl number of the polyol was 58.9.

EXAMPLE 3

The procedure of Example 2 was followed except that the DPG added in the second step was mixed with the PO to form the cap. The hydroxyl number of the polyol was 55.5.

EXAMPLE 4

The procedure of Example 1 was followed except 542 parts of GP, 918 parts of EO, and 3130 parts of PO were added in the first addition. In the second addition, 215 parts of DPG and 1195 parts of PO were added. The DPG was mixed with the PO. The polyol had a 50 percent by weight PO cap and the hydroxyl number of the polyol was 58.9.

EXAMPLE 5

The procedure of Example 1 was followed except 528 parts of GP, 918 parts of EO, and 1104 parts of PO were added in the first addition. In the second addition, 215 parts of DPG and 1150 parts of PO were added. A third addition of 1150 parts of PO was made when the triol equivalent weight was 1602. The polyol had a 50 percent by weight PO cap and a hydroxyl number of the polyol was 55.0.

Examples 6–10 illustrate the preparation of polyurethane foams using the polyols made in Examples 1–5. The general method for preparing the foam was to mix the polyol, distilled water, surfactant, and DABCO 33LV for 30 seconds using a Penncraft 4123 Drill Press equipped with a multi-bladed stirrer. The tin catalyst (T-9) was added and mixed for 15 seconds. The 80/20 TDI isomer mixture was added with stirring, mixed for five seconds and poured into a cake box where the foam was allowed to rise. After the foam had risen, it was cured in an oven for 10 minutes at 110° C. The foam formulation and foam properties are shown in Table I which follows.

TABLE I

| Examples | 6 | 7 | 8 | 9 | 10 |
|---|---|---|---|---|---|
| Formulation | | | | | |
| 80/20 TDI, parts | 157.7 | 156.7 | 156.0 | 156.9 | 155.7 |
| Polyol Blend, number | 1 | 2 | 3 | 4 | 5 |
| Parts Blend | 300 | 300 | 300 | 300 | 300 |
| Water, parts | 12 | 12 | 12 | 12 | 12 |
| Surfactant, parts | 3 | 3 | 3 | 3 | 3 |
| DABCO 33LV, parts | 1 | 1 | 1 | 1 | 1 |
| T-9 | 0.27 | 0.27 | 0.27 | 0.27 | 0.27 |
| Foam Properties | | | | | |
| Density, pcf | 1.65 | 1.63 | 1.58 | 1.58 | 1.63 |
| Tensile Strength, psi | 19.1 | 20.7 | 21.3 | 21.1 | 19.4 |
| Elongation, % | 140 | 133 | 177 | 133 | 137 |
| Tear, pi | 2.7 | 3.1 | 3.1 | 3.0 | 3.4 |
| ILD (lb/50 sq. in.) | | | | | |
| 25% defl. | 38.0 | 44.7 | 34.0 | 53.2 | 43.2 |
| 65% defl. | 79.9 | 93.8 | 72.2 | 91.8 | 88.2 |
| 25% return | 26.0 | 25.2 | 21.8 | 24.2 | 24.4 |
| Sag Factor | 2.10 | 2.10 | 2.12 | 1.73 | 2.04 |
| Guide Factor | 23.1 | 27.4 | 21.5 | 33.7 | 26.4 |
| % Recovery | 68.4 | 56.4 | 64.1 | 45.5 | 56.5 |
| CLD (psi) 50% defl. | .53 | .62 | .50 | .63 | .62 |
| Compression Sets, % Set | | | | | |
| 50% Comp. | 6.4 | 10.2 | 6.4 | 10.2 | 10.1 |
| 90% Comp. | 6.9 | 12.9 | 8.5 | 12.9 | 13.9 |
| Air flow, cfm at .5" $H_2O$ | 5.2 | 6.0 | 6.5 | 5.8 | 6.4 |

The embodiments of the invention in which an exclusive privilege or property is claimed are defined as follows:

1. A delayed co-initiation process for preparing polyol blends comprising
   (a) oxyalkylating a first initiator compound which contains at least two active hydrogen atoms to obtain a polyol with an equivalent weight from 100 to 10,000; and
   (b) adding a second initiator which may be the same as or different from the first and oxyalkylating to obtain a polyol with an equivalent weight from 100 to 10,000 based upon the second initiator, said oxyalkylations occurring at temperatures from about 105° to about 160° C., wherein said first and second initiator is a polyhydric alcohol.

2. The process of claim 1 wherein the first initiator has at least three active hydrogen atoms as determined by the Zerewittinoff method.

3. The process of claim 2 wherein the first initiator is glycerin.

4. The process of claim 2 wherein the second initiator has at least two active hydrogen atoms as determined by the Zerewittinoff method.

5. The process of claim 4 wherein the second initiator is dipropylene glycol.

6. The process of claim 1 wherein the second initiator is added immediately before the first initiator is capped with an epoxide.

7. The process of claim 1 wherein the second initiator is mixed with an epoxide used for capping.

* * * * *